United States Patent
Beauchamp et al.

(10) Patent No.: US 10,118,441 B1
(45) Date of Patent: Nov. 6, 2018

(54) REVERSIBLE AXLE SPINDLES ON SMALL BOAT DOLLIES

(71) Applicants: James Woodrow Beauchamp, Atlanta, GA (US); Thomas Lee Beauchamp, Atlanta, GA (US); Robert Frazier Beauchamp, Atlanta, GA (US)

(72) Inventors: James Woodrow Beauchamp, Atlanta, GA (US); Thomas Lee Beauchamp, Atlanta, GA (US); Robert Frazier Beauchamp, Atlanta, GA (US)

(*) Notice: Subject to any disclaimer, the term of this patent is extended or adjusted under 35 U.S.C. 154(b) by 0 days.

(21) Appl. No.: 15/338,405

(22) Filed: Oct. 30, 2016

Related U.S. Application Data (63) Continuation-in-part of application No. 14/058,232, filed on Oct. 19, 2013, now abandoned.

(51) Int. Cl.
| | |
|---|---|
| *B60B 35/00* | (2006.01) |
| *B60B 35/02* | (2006.01) |
| *B60B 35/04* | (2006.01) |
| *B60P 3/10* | (2006.01) |
| *B62D 63/08* | (2006.01) |

(52) U.S. Cl.
CPC .......... *B60B 35/004* (2013.01); *B60B 35/025* (2013.01); *B60B 35/04* (2013.01); *B60B 2320/10* (2013.01); *B60B 2900/351* (2013.01); *B60P 3/1033* (2013.01); *B62D 63/08* (2013.01)

(58) Field of Classification Search
CPC ......... B60B 35/00; B60B 35/02; B60B 35/10; B60B 35/1009; B60B 35/1018; B60B 35/14; F16B 37/00; F16B 21/12; F16B 2021/14
See application file for complete search history.

(56) References Cited

U.S. PATENT DOCUMENTS

| | | |
|---|---|---|
| 2,632,355 A | 3/1953 | Becker |
| 2,973,209 A | 2/1961 | Shaw |
| 3,135,560 A | 6/1964 | Carlson |
| 3,375,995 A | 4/1968 | Roman |
| 3,406,985 A | 10/1968 | Ballenger |
| 4,448,565 A | 5/1984 | Peterson |
| 4,828,328 A | 5/1989 | Bowman |
| 4,850,605 A | 7/1989 | Ray |
| 5,401,080 A | 3/1995 | Wenzel |
| 5,484,192 A | 1/1996 | Degelman |
| 6,926,371 B1 | 8/2005 | Gagnon |
| 7,108,336 B2 | 9/2006 | Dombroski |
| 7,234,783 B2 | 6/2007 | MacKarvich |
| 7,731,301 B2 | 6/2010 | Pell |

(Continued)

*Primary Examiner* — Jason R Bellinger (57) ABSTRACT

A reversible spindle embodiment for a small sailboat dolly axle includes 2 spindle elements, one on each end of the same reversible spindle embodiment connected by a central interconnecting mounting element. Each spindle element is designed to mate with a wheel hub having a different size diameter and/or width. The unused spindle element and the central interconnecting mounting element are inserted into the hollow end of the dolly axle and secured with fasteners through the walls of the axle and mounting element. The desired spindle element is inserted through the wheel hub and secured. To mount a wheel having a different hub size matching the unused spindle element, the fasteners are removed, the reversible spindle is rotated 180 degrees and the fasteners reinstalled.

3 Claims, 10 Drawing Sheets

(56) References Cited

U.S. PATENT DOCUMENTS

| | | |
|---|---|---|
| 9,440,490 B2 | 9/2016 | Crockett, Jr. |
| 2015/0108827 A1* | 4/2015 | Beauchamp .......... B60B 35/025 301/132 |

* cited by examiner

REVERSIBLE AXLE SPINDLES ON SMALL BOAT DOLLIES

CROSS-REFERENCE TO RELATED APPLICATIONS

This application is a continuation-in-part of U.S. patent application Ser. No. 14/058,232, filed Mar. 16, 2013 and abandoned on Nov. 8, 2016. This application claims the benefit of provisional patent application Ser. No. 61/729,398, filed Nov. 22, 2012 by the above inventors.

FEDERALLY SPONSORED RESEARCH

None

SEQUENCE LISTING

None

BACKGROUND

The present invention relates to reversible axle spindles and, more particularly, to a reversible axle spindle sized to accommodate different wheel hub bearing surface dimensions for use in an axle assembly on small sailboat and dinghy boat dollies.

Boat dollies are lightweight devices used to portage small sailboats or dinghies to and from water, to hand launch small sailboats or dinghies into water from beaches, ramps or other shores and to store these small boats in boatyards. A boat dolly is generally smaller than a boat trailer with smaller wheels and is not suitable for towing a boat on the road. A number of dolly designs are currently available in the marketplace consisting of a lightweight longitudinal frame, transverse handle, axle that extends transverse to the longitudinal frame with spindle and wheels.

Figure 1A:
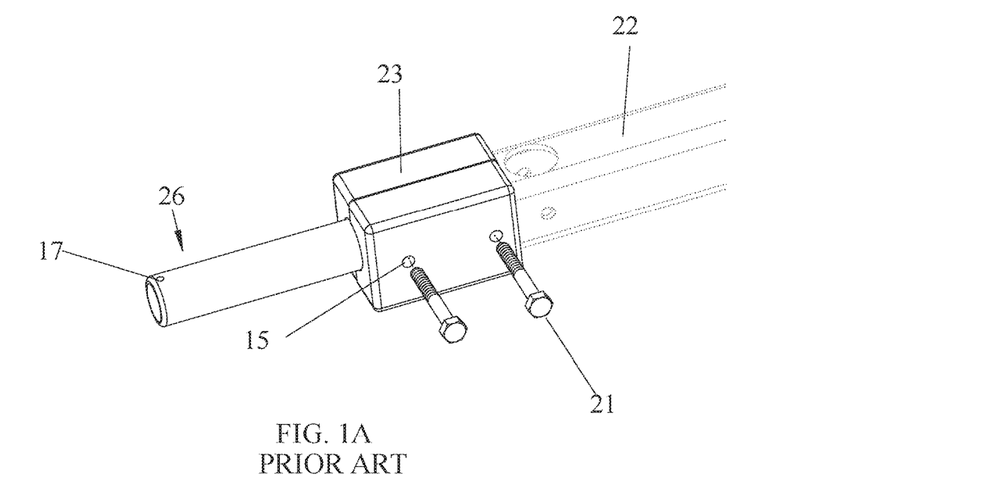
FIG. 1A is a side perspective view showing an axle frame, spindle and spindle bracket using fasteners to achieve spindle stabilization.
Figure 1B:
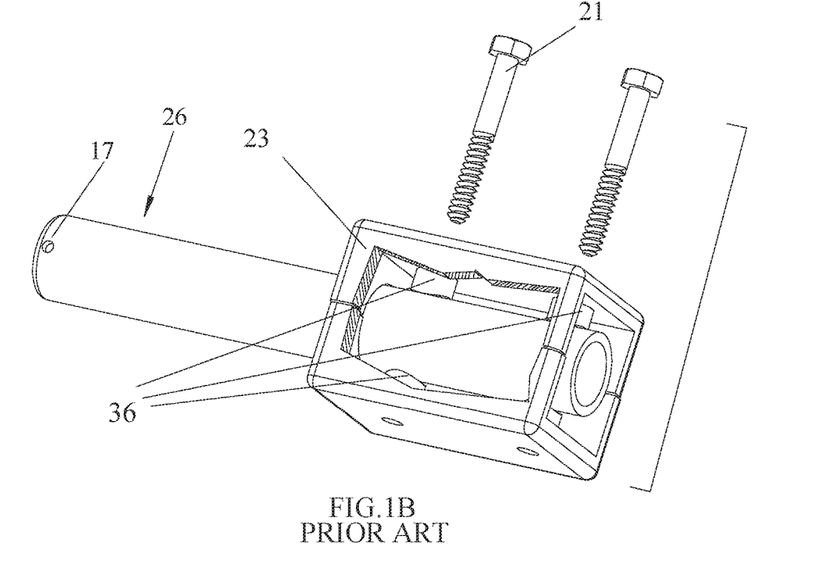
FIG. 1B is a side perspective cut-away view of spindle and spindle bracket showing ferrules and fasteners to achieve spindle stabilization.
Figure 1C:
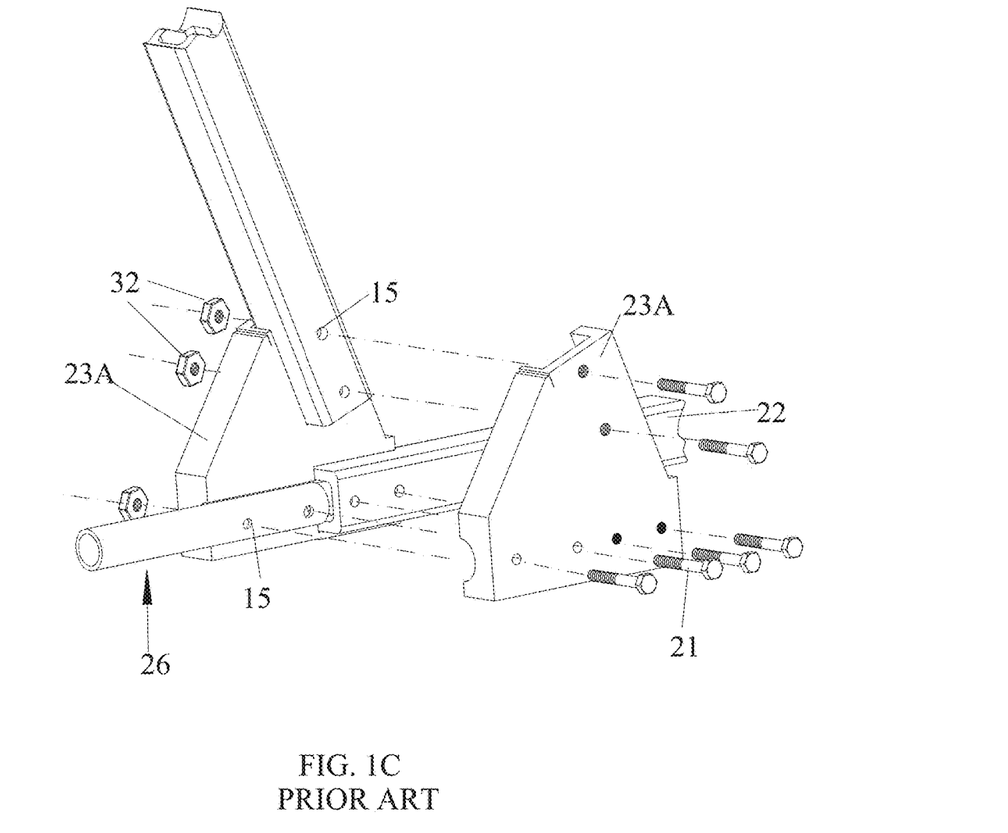
FIG. 1C is a side perspective expanded view of spindle and spindle bracket showing a groove to achieve spindle stabilization.

Most dollies and their corresponding axles are framed with square aluminum tubing, but may be of other configurations. (Examples shown in FIGS. 1A and 1C). Wheels are usually attached to the axle with a spindle (26) that extends longitudinally from the axle frame. Various brackets (23 & 23A) and fasteners (21) are used to attach the spindle to the axle frame (22) as shown in FIGS. 1A through 1C. The spindle inserts through a hub of the wheel and the wheel is secured on the spindle by means of a cotter pin or similar attaching device on its outer end. On commercially available small sailboat dollies, the original equipment spindle is often sized to accept wheels with hubs sized approximately one inch in diameter and a hub width of approximately three inches to five inches. The spindle will not accept wheel hubs with different dimensions; thereby limiting the use of more readily available aftermarket replacement wheels.

The wheels and tires are usually of low load specification, since small boat dollies are subjected to low load forces (typically less than 500 pounds). They have a limited life span due to deterioration of the rubber tire and/or the plastic wheel rim resulting from dolly use in corrosive environments such as fresh or salt water, outside storage and UV radiation from the sun. Consequently, wheels are considered replaceable items. For replacement, wheels and tires are typically sold as a unit. Options for these replacement wheels are limited, since more readily available aftermarket wheel and tire units meeting tire load specifications of the original equipment have hubs requiring axle spindles with a smaller diameter size than the original equipment spindle.

Specialty wheels that offer desirable characteristics useful for portage of boats over different terrains and ramp launching conditions are also available aftermarket. These include wheels of different widths and/or diameters designed for sandy beaches or rough terrain and wheels with tires that will not go flat. However, these aftermarket wheels cannot be used with the original equipment spindle because they have either wheels hubs that are smaller in diameter than the original equipment spindle or wheel hubs that require a longer spindle. Use of these aftermarket wheels requires the end user to also purchase an aftermarket spindle. No size adapter systems are commercially available.

Accordingly, an object of the present invention is to provide a reversible axle spindle that will accommodate both original equipment manufacturers wheels and specialty wheels with different sized wheel hub bearing surfaces.

Another object is to provide a reversible spindle that offers the end user greater flexibility and economy in the purchase of replacement and original equipment manufacturer aftermarket wheels.

SUMMARY

Briefly described, the present invention concerns a reversible spindle, particularly for, but not limited to, small boat dolly axles that provides for a different spindle size on each end of the same embodiment. This embodiment improves current designs by allowing the end user adaptability to and use of replacement wheels requiring a variety of different spindle sizes. Different spindle size options provide the opportunity to use a variety of replacement or original manufacturer aftermarket wheels and tires accommodating different utilization requirements by the end user.

In accordance with the preferred embodiment, a reversible spindle for a dolly axle comprises three elements: a first external element, a central interconnecting mounting element and a second external element. A first external element provides a spindle designed to mate with the bearing surface of a wheel hub having a predetermined diameter and length. The central interconnecting mounting element mates with an existing axle frame and serves to stabilize the embodiment in the vertical and horizontal directions. Upon reversal of the embodiment, the second external element provides a second spindle designed to mate with the bearing surface of a wheel hub having a predetermined diameter and length different from the first element on the opposing end of the embodiment.

The central interconnecting mounting element and one of the opposing end elements (first or second) inserts into the hollow end of an axle frame in the preferred location at the end of the axle frame and is secured with fasteners. In the embodiment disclosed herein, the axle is square in cross-section, but may be of other configurations.

A feature of the present invention is the reversibility of the dolly axle spindle incorporating two different spindle sizes. This embodiment improves current designs by providing a previously unavailable reversible dolly spindle.

Another feature of the embodiment is the cooperative relationship between the central interconnecting mounting element and the axle to assure the correct placement, alignment and stability of each spindle element.

Another feature is the ability of the end user to utilize more readily available replacement wheels which may have different hub bearing surfaces from original equipment manufacturer-supplied wheels. These replacement wheels are relatively inexpensive compared with original equipment wheels and are available in a wide variety of styles and sizes to meet different terrain conditions.

Accordingly, an object of this invention is to provide an improved axle spindle for a wheeled dolly that includes a reversible spindle which allows the end user to replace wheels with different purpose wheels on small boat dollies conveniently, quickly and easily while in the field.

Another object is to provide an axle spindle for a wheeled dolly that facilitates accurate and secure mounting of a spindle to an axle and facilitates the removal of the spindle from the axle.

Another object of this invention is to provide a reversible axle that is of simple and economic construction and assembly.

Other features, objects and advantages of one of more aspects of the present invention will be apparent from a study of the following description and accompanying drawings.

BRIEF DESCRIPTION OF THE DRAWINGS

FIGS. 1A to 1C—Prior Art. Perspective views of common spindle brackets and attachment of spindles.

DETAILED DESCRIPTION

Figure 2:
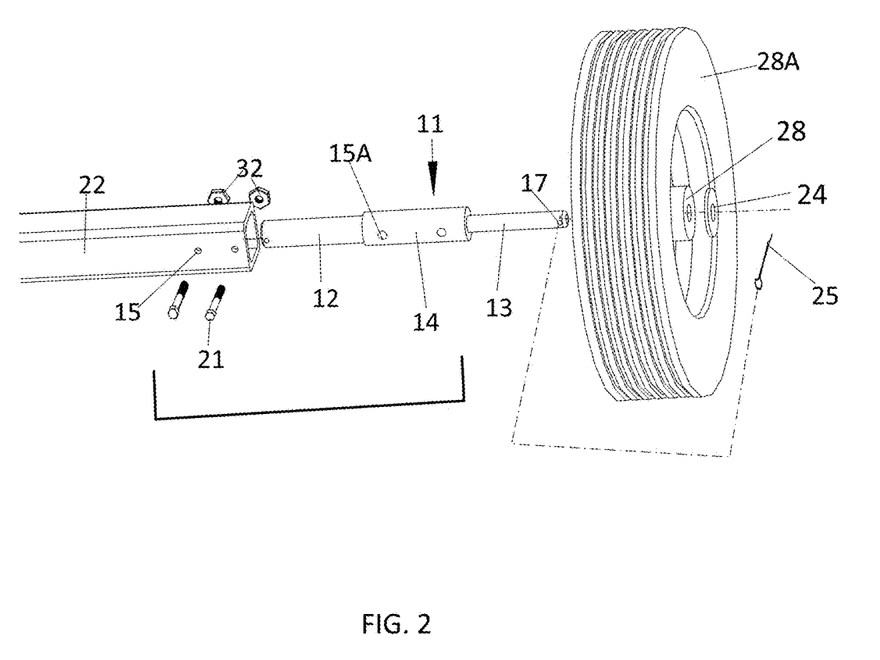
FIG. 2 is a side perspective view showing an embodiment of a reversible axle spindle constructed to fit the hollow end of a square axle and a wheel to be mounted on the external support element of the embodiment.
Figure 2A:
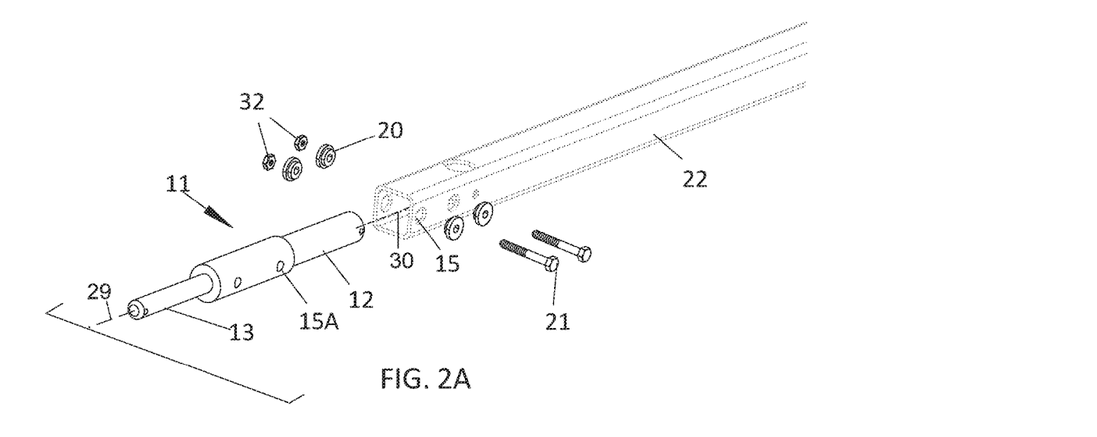
FIG. 2A is a side perspective expanded view of the reversible axle spindle showing shoulder washers and fasteners of one embodiment of a reversible axle spindle.
Figure 2B:
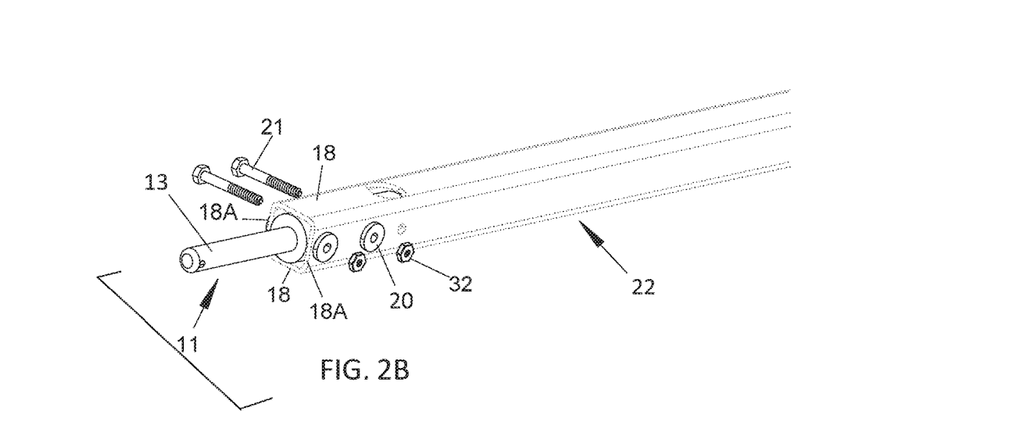
FIG. 2B is a side perspective view of one embodiment of a reversible axle spindle fitting into a square axle and showing shoulder washers for bolts to fit manufacturer-drilled fastener holes in axle.

Referring to the drawings, like numerals indicate like parts throughout the several views, FIG. 2 shows, in an expanded relationship, one open end of axle 22 and an embodiment of a reversible axle spindle 11 and a wheel 28A. FIG. 2A shows, in an expanded relationship, one open end of axle 22 and an embodiment of a reversible axle spindle 11. FIG. 2B shows, in an expanded relationship, one open end of axle 22 and an embodiment of a reversible axle spindle 11 received in the axle 22.

Axle 22 shows properties typical of small boat dolly axles. It is tubular in configuration, square in cross section, and has a constant cross-sectional dimension throughout its length across the width of a dolly. Dolly is not shown. For purposes of illustration of the embodiment, only one open end of axle 22 is shown. Axle 22 includes opposed top and bottom walls 18 and opposed sidewalls 18A. Fastener holes 15 of predetermined sizes perpendicular to the longitudinal axis (30) (FIG. 2A) of axle 22 are located for mounting spindles and/or spindle brackets. These fastener holes (15) are drilled in the midline therethrough the distal lateral walls 18A of axle.

Figure 3:
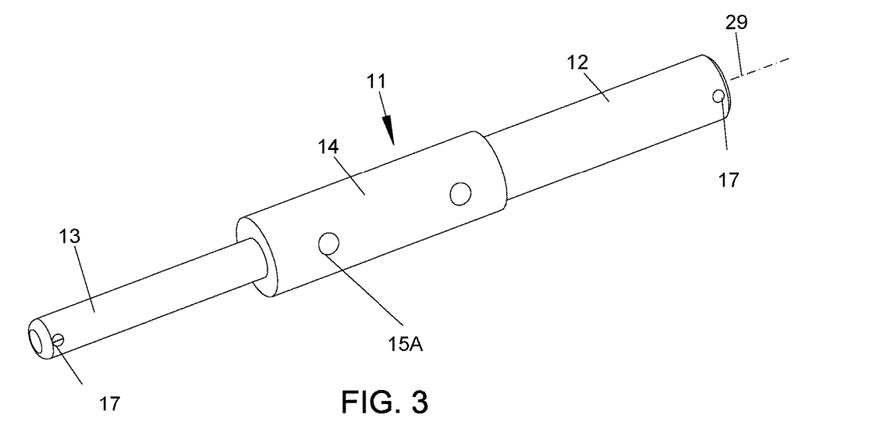
FIG. 3 is a side perspective view of an embodiment of a reversible axle spindle with a round central interconnecting mounting element.

FIG. 3 shows the physical properties of reversible axle spindle 11. We contemplate that reversible axle spindle 11 is machined aluminum, but its composition may be machined, cast, or extruded aluminum or other metals, molded, machined, or extruded plastics or molded or machined laminated fibrous materials of sufficient strength to support the dolly and boat with all its attachments. Reversible axle spindle 11 is designed to provide a different sized wheel support element on opposing ends of the same embodiment. Reversible axle spindle 11 comprises three elements; a first wheel support element 13 located on the first end, an adjacent interconnecting element 14, for mounting the embodiment, and a second wheel support element 12 on the second end of the embodiment. The three elements are located along the same longitudinal axis (29) (FIG. 2A). Reversible axle spindle 11 is inserted into each of the two hollow ends of the axle such that when in use, one wheel support element 12 or wheel support element 13 of each reversible axle spindle 11 is external to axle 22 and one wheel support element 12 or wheel support element 13 is stored internally in the axle 22.

Wheel support element 13 is round, substantially cylindrical, and shaped for receiving the inside bearing surface of a wheel hub having a predetermined diameter and length for rotatably journaling a wheel. A hole 17 is placed at the outer or distal end of wheel support element 13 to accept a cotter pin 25 or similar device to secure the wheel hub 28 shown in FIG. 2.

Figure 4:
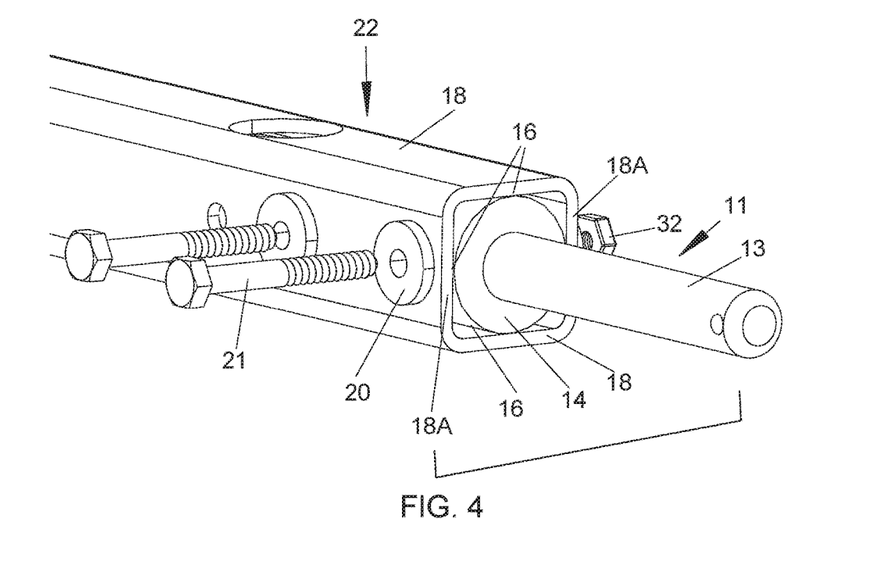
FIG. 4 is a side perspective view of an embodiment of a reversible axle spindle with a round central interconnecting mounting element showing contiguous points and lines with inside walls of square axle.
Figure 4A:
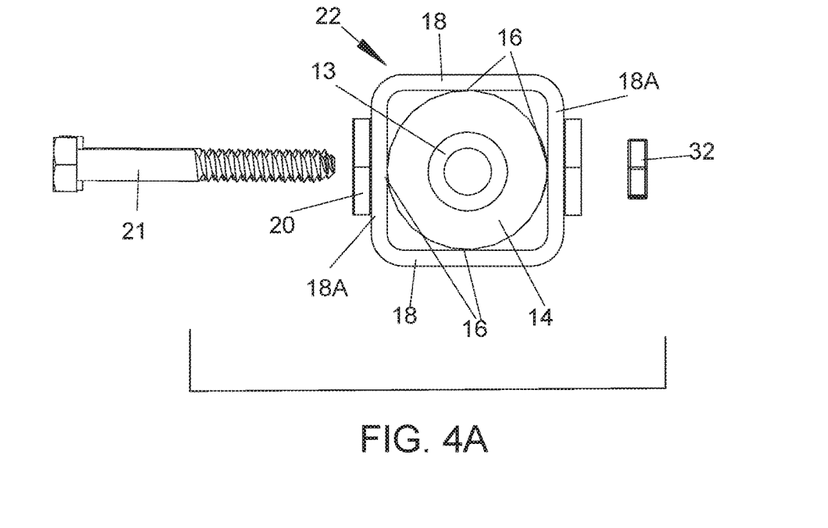
FIG. 4A is a front view of an embodiment of a reversible axle spindle with a round central interconnecting mounting element showing contiguous points and lines with inside walls of square axle.

We contemplate that central interconnecting mounting element 14 is round in cross section, but it may possess other cross-sectional shapes. Central interconnecting mounting element 14 inserts into the hollow end of axle 22. Shown in FIGS. 3, 4 and 4A, central interconnecting mounting element 14 has a uniform diameter of predetermined dimension and is sized to be contiguous along four lines of contact 16 throughout its length with the inside surfaces of the four walls 18 and 18A of axle 22. The four lines of contact 16 with axle 22 are coaxial with respect to the longitudinal axis 29 of central interconnecting mounting element 14 and axle 22 and stabilize reversible axle spindle 11 in the vertical and horizontal directions shown in FIGS. 4 and 4A. Fastener holes 15A drilled perpendicularly to the longitudinal axis 29 through central interconnecting mounting element 14 in preselected locations align with selected existing fastener holes 15 in axle 22 to accept fasteners 21 inserted through the walls of axle 22 and central interconnecting mounting element 14 and secured with threaded nuts 32. The positions of the fastener holes 15 and 15A are selected so that when longitudinal axis 29 of reversible axle spindle 11 is reversed; the fastener holes 15A still align with existing axle 22 fastener holes 15. Fasteners through fastener holes 15 and 15A in the axle walls and through the central interconnecting mounting element 14 stabilize the reversible axle spindle in longitudinal direction along the axis 30 (FIGS. 2A and 2C) of axle 22 thereby forming a rigid connection between reversible axle spindle 11 and axle 22.

Figure 3A:
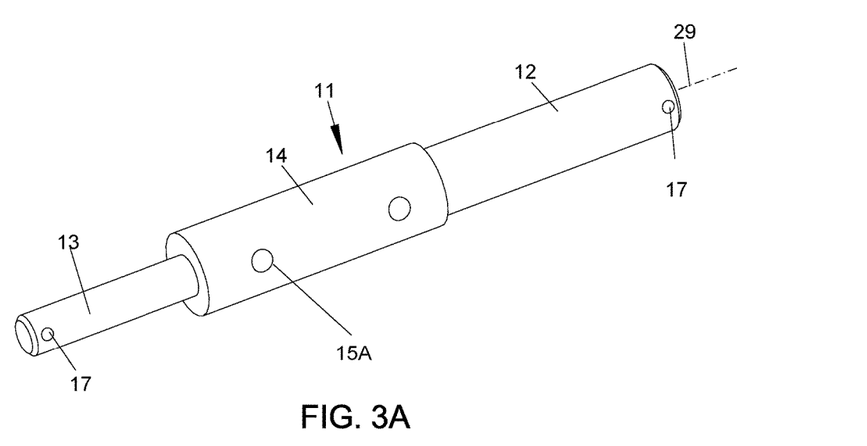
FIG. 3A is a side perspective view of an embodiment of a reversible axle spindle with a round central interconnecting mounting element showing wheel support elements of disparate lengths.

At the second end of the mounting end of reversible axle spindle 11, the second wheel support element 12 is substantially cylindrical, round in cross section, and has a different diameter and/or length from its opposite wheel support element 13 for rotatably journaling a different sized wheel hub (FIGS. 3 and 3A). When in use, wheel support element 12 is positioned external to axle 22 by reversing reversible axle spindle 11. Wheel support element 12 is shaped to receive the inside bearing structure of a wheel hub with diameter and/or length different from wheel support element 13. Wheel support element 12 may or may not be the same diameter as central interconnecting mounting element 14. A hole 17 is placed at the outer or distal end of wheel support element 12 to accept a cotter pin 25 or similar device to secure the wheel hub 28 shown in FIG. 2.

Figure 5:
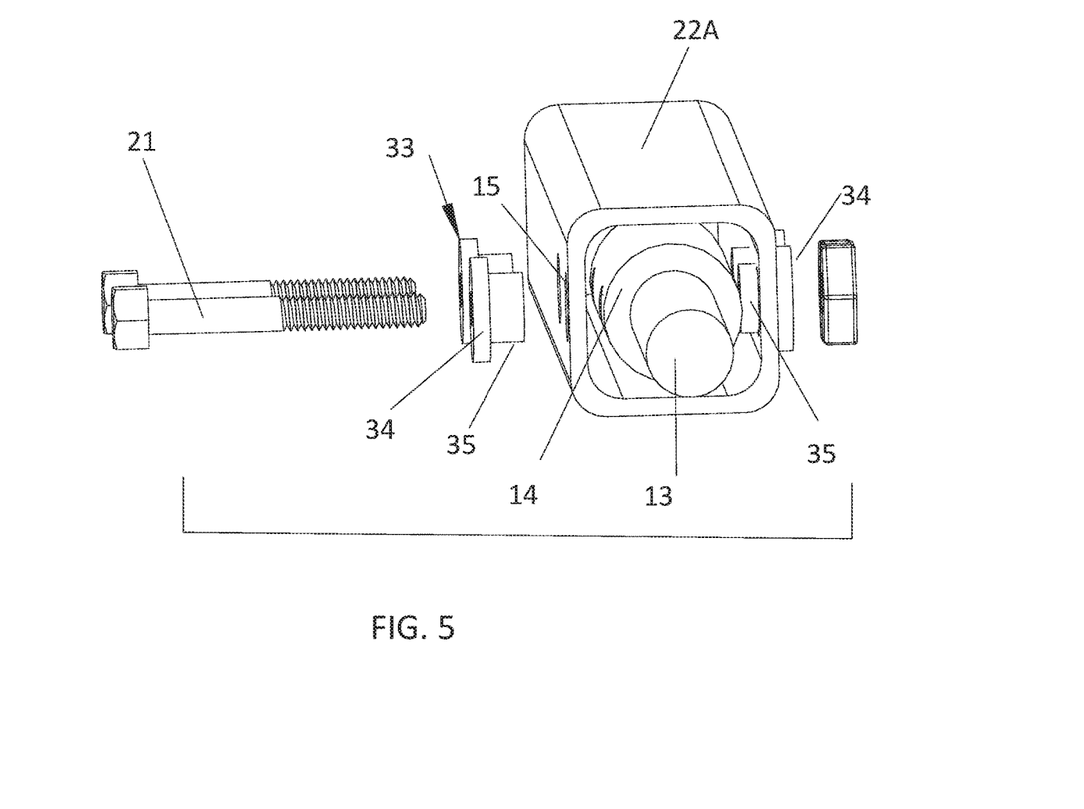
FIG. 5 is a front perspective view of an embodiment of a reversible axle spindle using alternate means for securing axle spindle when inside walls of axle are not contiguous with central interconnecting mounting element of embodiment.

FIG. 5 shows a stabilizer bushing 33 designed to stabilize reversible axle spindle 11 when reversible axle spindle is used with a square axle 22A having a width larger than the diameter of central interconnecting mounting element 14. Stabilizer bushing 33 is comprised of machined or cast aluminum or other metals, molded, machined or extruded plastics, or molded or machined laminated fibrous materials. Stabilizer bushing 33 is comprised of a widened cap 34 that functions as a washer with an extended ferrule 35 that extends into axle 22, through fastener holes 15, and comes into direct contact with central interconnecting mounting element 14 thereby preventing the horizontal movement relative to the longitudinal axis 30 of axle 22A by the central interconnecting mounting element 14. Fasteners 21 are inserted through the stabilizer bushing 33 and central interconnecting mounting element 14 and prevent vertical and fore and aft movement of the central interconnecting mounting element 14 along the axis 30 of axle 22A.

Figure 6:
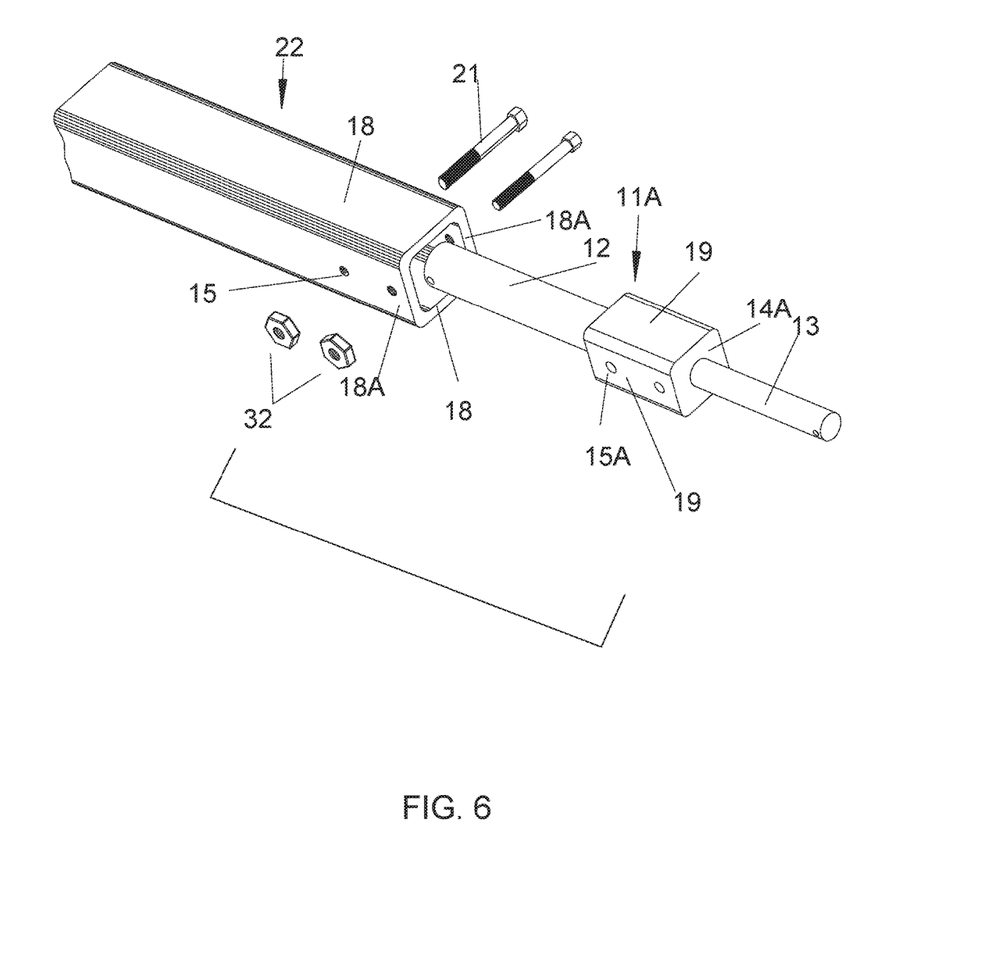
FIG. 6 is a side perspective expanded view of an additional embodiment of a reversible axle spindle machined with a square central interconnecting mounting element.
Figure 6A:
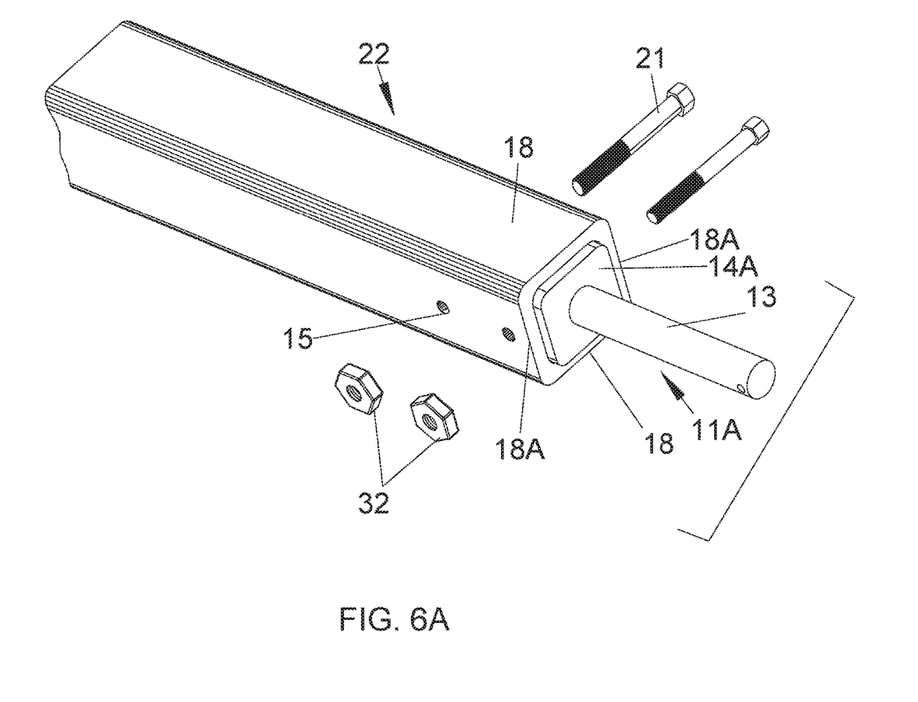
FIG. 6A is a side perspective partially expanded view of the embodiment shown in FIG. 6 fitting into square axle.

FIGS. 6 and 6A show another embodiment of reversible axle spindle 11A having a central interconnecting mounting element 14A with a square cross-sectional shape with rounded corners (or shaped as necessary to be contiguous with the inside four walls 18 and 18A of axle 22). The contact of the four sides 19 of central interconnecting mounting element 14A throughout its length with the inside surface of the four walls 18 and 18A of axle 22 are coaxial with respect to the longitudinal axis (29) of central interconnecting mounting element 14A and axle 22 and stabilize reversible axle spindle 11A in the vertical and horizontal directions shown in FIGS. 6 and 6A. Fastener holes 15A drilled perpendicular to the longitudinal axis 29 through central interconnecting mounting element 14A in preselected locations align with selected existing fastener holes 15 in axle 22 to accept fasteners 21 inserted through the walls of axle 22 and central interconnecting mounting element 14A and secured with threaded nuts 32. The positions of the fastener holes 15 and 15A are selected so that when the longitudinal axis (29) of reversible axle spindle 11A is reversed; the fastener holes 15A still align with existing fastener holes 15 in axle 22. Fasteners through fastener holes 15 and 15A in the axle walls and through the central interconnecting mounting element 14A stabilize the reversible axle spindle 11A in longitudinal direction along the axis (30) of axle 22 thereby forming a rigid connection between reversible spindle 11A and axle 22.

Operation

Reversible axle spindle 11 has two wheel support elements 12 and 13 located on opposite ends of the embodiment (FIG. 3). Each wheel support element 12 or 13 accepts wheel hubs having complementary matching bearing surfaces 28 of different sizes (diameter and/or length) (FIG. 2). The user selects either wheel support element 13 or wheel support element 12 to fit the bearing surface size of the wheel to be mounted on axle 22. The selected wheel support element 13 or wheel support element 12 will be external to axle 22.

To install reversible axle spindle 11, any preexisting manufacturer's brackets, manufacturer's spindle, and fasteners are removed. When the axle 22 is ready to receive reversible axle spindle 11, existing fastener holes 15 and/or drilled fastener holes 15 along the midline of the sides of axle 22 will be spaced to match the fastener holes 15A in the central interconnecting mounting element 14 to locate distal end of axle 22 and central interconnecting mounting element 14 in a predetermined location.

To install reversible axle spindle 11, the unselected wheel support element 12 or wheel support element 13 of reversible axle spindle 11 and the central interconnecting mounting element 14 are inserted into the open end of axle 22 and the existing fastener holes 15 aligned with those of the central interconnecting mounting element 15A, as shown in FIGS. 2A and 2B. Fasteners 21 are inserted through shoulder washers 20 or flat washers (not shown) if needed and the side walls of axle 22 and central interconnecting mounting element 14 and threaded nuts 32 or other type retainers are tightened thereby forming a rigid connection between central interconnecting mounting element 14 and axle 22.

Existing fastener holes 15 drilled by the original equipment manufacturer can be used to mount reversible axle spindle 11 if in proper location but may possess a different diameter from fasteners 21. In this case, appropriately designed shoulder washers 20, shown in FIG. 2A, are used to adapt fastener holes 15 existing in the axle 22 to fasteners 21. Fasteners 21 are inserted through the fastener holes in the shoulder washers 20, the axle 22 fastener holes 15 and the reversible axle spindle fastener holes 15A and threaded nuts 32 tightened. If fastener holes 15 are the same size as fasteners 21, flat washers may be used. If the diameter of axle 22A is larger than reversible axle spindle 11, stabilizer bushings 33, shown in FIG. 5, are used instead of shoulder washers 20 or flat washers (not shown) to establish a rigid connection between central interconnecting mounting element 14 and axle 22A.

The selected wheel support element 12 or wheel support element 13, is inserted through the hub of a new wheel 28 and the retaining washer 24 shown in FIG. 2. A cotter pin 25 or other device is inserted through the hole 17 in the outer end of wheel support element 12 or 13 to secure wheel hub 28.

Figure 2C:
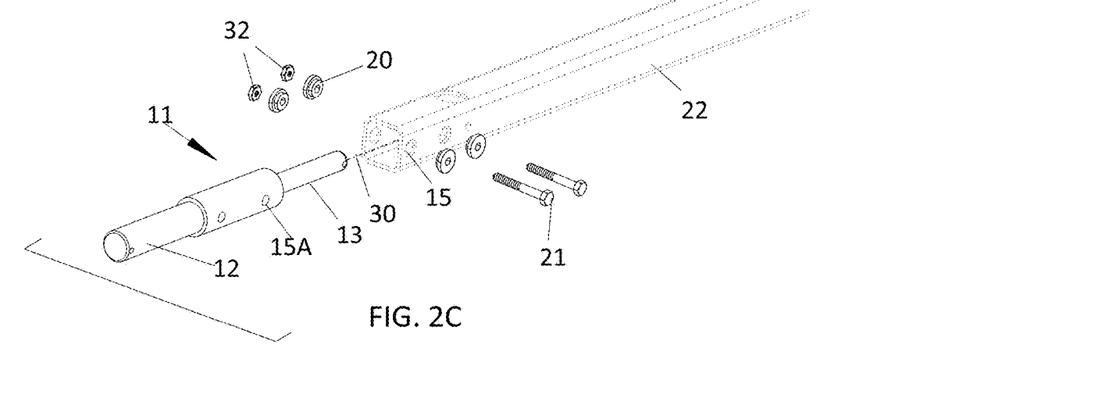
FIG. 2C is a side perspective expanded view showing one embodiment of a reversible axle spindle in reversed position from position shown in FIG. 2A.
Figure 2D:
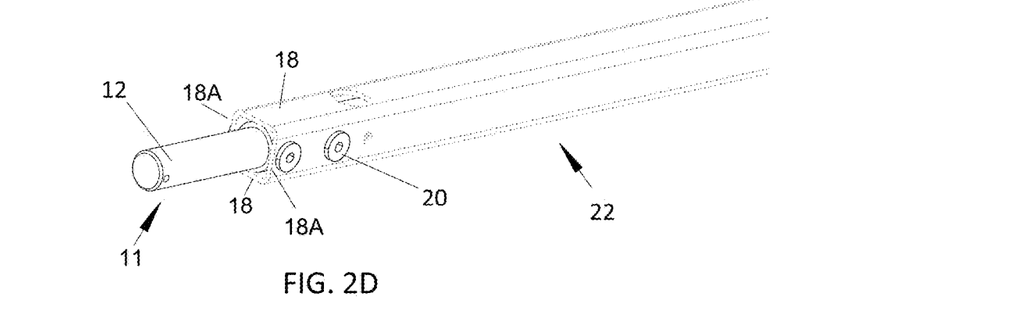
FIG. 2D is a side perspective view showing one embodiment of a reversible axle spindle reversed from position shown in FIG. 2B fitting into axle.

When user desires to mount a wheel possessing a different wheel hub bearing surface 28 unmatched to the heretofore selected wheel support element 12 or wheel support element 13, but matching the heretofore unselected wheel support element 12 or 13 stored interior to axle 22, reversible axle spindle 11 is first reversed with respect to its longitudinal axis (29). (FIGS. 2A, 2B, 2C, and 2D) Fasteners 21 are removed and reversible axle spindle 11 is disengaged from the open end of axle 22. Reversible axle spindle 11 is rotated one hundred eighty degrees with respect to the longitudinal axis (29) and reinserted into the open end of axle 22. (See FIGS. 2A and 2B for original position of reversible axle spindle 11 and FIGS. 2C and 2D for rotated position). Existing fastener holes 15 are aligned with those of the central interconnecting mounting element 15A as shown in FIG. 2C. Fasteners 21 are inserted through the shoulder washers 20, the axle 22 fastener holes 15 and the fastener holes 15A therethrough the central interconnecting mounting element 14 of the reversible axle spindle 11. Threaded nuts 32 are attached and tightened.

Selected wheel support element 12 or wheel support element 13 is inserted though the hub of a new wheel 28 shown in FIG. 2 and the retaining washer 24. Cotter pin 25, or other device, is inserted through the hole 17 in the outer end of the reversible axle spindle 11 to secure wheel hub 28.

CONCLUSION, RAMIFICATIONS, AND SCOPE

Thus the embodiments of the reversible axle spindle for dolly axles provide a useful, easily-installed, previously unavailable and economical method of varying the dolly axle spindle size so the user can use replacement or original equipment manufacturer aftermarket wheels and tires that have hub bearing surface sizes different from original equipment. Non-original equipment manufacturer aftermarket replacement wheels are relatively inexpensive compared with original equipment manufacturer supplied aftermarket wheels and are also available in a wide variety of styles to meet different user needs, including use on different terrains. Furthermore, the reversible axle spindle has the additional advantages such that:

The ease of removal and replacement of wheels on this invention and the ability to access a range of spindle sizes with the same spindle provides the end user with an option of expediently substituting a variety of wheels when he portages his dolly under different conditions and on different terrains whether in the field, in the boat yard or on the beach.

The reversible axle spindle provides its own stabilization to the axle frame, thereby eliminating the need for an additional spindle bracket to provide stabilization, as required by some original equipment manufacturer dollies. The ability to function without the original equipment manufacturer spindle bracket enhances its flexibility and adaptability to a wide range of dolly axles.

The embodiments of the reversible axle spindle offer the end user greater flexibility and economy in the purchase of replacement and original equipment manufacturer aftermarket wheels.

The reversible spindle is easily modified to function with axle frames of different styles by modifying the central interconnecting mounting element between the proximal and distal wheel support elements, and/or by providing a stabilizer bushing or shoulder washer.

Spindles may be color coded to provide easy recognition of sizes which would be useful for sailing clubs for retrofitting wheels.

While the above description contains much specificity, these should not be construed as limitations on the scope, but rather as an amplification of several embodiments thereof. Many other variations are possible. Accordingly, the scope should be determined not by the embodiments illustrated, but by the appended claims and their legal equivalents.

We claim:

1. A spindle device for the hollow ends of an axle of a small boat dolly to engage and rigidly mount wheel hubs having bearing surfaces with substantially disparate sizes comprising:

a. a reversible spindle having a first end, a second end and a central interconnecting mounting element,
  said reversible spindle received in and extending into a hollow end of an axle in either a first direction or a reverse direction,
  said hollow end of said axle including therein internal surfaces of opposed top, bottom, and side walls for engaging said reversible spindle;
b. a first wheel support element being located on said first end of said reversible spindle,
  said first wheel support element received in a first wheel hub for rotatably journaling said first wheel hub, wherein:
  said first wheel support element sized and shaped to be contiguous with a bearing surface of said first wheel hub having a predetermined diameter and length,
  said first wheel support element being located external to said hollow end of said axle when said reversible spindle is longitudinally inserted into said hollow axle in said first direction;
c. a second wheel support element being located on said second end of said reversible spindle,
  said second wheel support element including therein a surface for engaging a second wheel hub for rotatably journaling said second wheel hub, wherein:
  said second wheel support element sized and shaped to be contiguous with a bearing surface of said second wheel hub having a predetermined diameter and length,
  said second wheel support element having a diameter and/or length substantially disparate from the diameter and/or length of said first wheel support element on said first end of said reversible spindle,
  said second wheel support element received by and extends into said hollow end of said hollow axle when said reversible spindle is inserted along the longitudinal axis in said first direction,
  said second wheel element of said reversible spindle being located external to said hollow end of said axle when said reversible spindle is removed, reversed along the longitudinal axis, and re-inserted into said axle;
d. said central interconnecting mounting element received by and extending into said hollow end of said axle,
  said central interconnecting mounting element having a cross-section of predetermined diameter,
  said central interconnecting mounting element including therein longitudinal surfaces alignable with the longitudinal axis of said axle for engaging said internal surfaces of opposed top, bottom and side walls of said hollow end of said axle along contiguous lines when said interconnecting mounting element is inserted in said hollow end of said axle in either said first or said reverse direction;

e. said hollow end of said axle defining a plurality of fastener holes therethrough in predetermined locations, wherein:

said central interconnecting mounting element defining a plurality of fastener holes therethrough, said central interconnecting mounting element located in alignment with said plurality of fastener holes in said hollow end of said axle, a plurality of fasteners with helical threads received in and extending through said fastener holes in said axle and said central interconnecting mounting element of said reversible axle spindle, a plurality of threaded nuts for engaging said helical threads of said fasteners outside said axle for rigidly holding said fasteners in said axle, whereby said reversible spindle is rigidly mounted to said axle in a predetermined location by cooperative engagement of a combination of said longitudinal surfaces of said central interconnecting mounting element, contiguous said internal surfaces of opposing walls of said axle, and said fasteners and said threaded nuts through said fastener holes in said axle and said central interconnecting mounting element.

2. The reversible spindle of claim 1, wherein:

a. said plurality of fastener holes in said central interconnecting mounting element and said plurality of fastener holes in said contiguous internal surfaces of opposing walls of said axle remain located in alignment to receive said plurality of fasteners when said reversible spindle is reversed on the longitudinal axis.

3. A method to adapt a reversible spindle device for a hollow axle to accommodate wheel hubs having substantially disparate bearing surface dimensions and to facilitate rigid mounting of said reversible spindle including therein two different wheel support elements located on opposite ends of said reversible axle spindle and a central interconnecting mounting element comprising:

when said reversible axle spindle is to be attached to the axle:

selecting a wheel support element sized and shaped to engage the bearing surface of a wheel hub to remain external to said hollow axle for rotational journaling said wheel hub, inserting said central interconnecting mounting element and an opposite wheel support element of said reversible axle spindle longitudinally into said hollow end of the axle, rigidly attaching said central interconnecting mounting element and said opposite wheel support element internally with a plurality of mounting fasteners and a plurality of threaded nuts and, when said reversible spindle is to be removed from the axle to mount a wheel hub having a bearing surface sized and shaped to engage the bearing surface of said opposite attached wheel support element:

removing said plurality of mounting fasteners and said plurality of threaded nuts, disengaging said reversible spindle from said hollow end of said axle, rotating said reversible spindle one hundred eighty degrees with respect to the longitudinal axis of said reversible spindle, re-inserting rotated said reversible spindle into said hollow end of said axle, replacing said plurality of mounting fasteners and said plurality of threaded nuts for rigid mounting.

* * * * *